US011583954B2

United States Patent
Sakai

(10) Patent No.: US 11,583,954 B2
(45) Date of Patent: Feb. 21, 2023

(54) WELDING METHOD

(71) Applicant: KABUSHIKI KAISHA TOSHIBA, Minato-ku (JP)

(72) Inventor: Tetsuo Sakai, Taito (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 231 days.

(21) Appl. No.: 16/792,942

(22) Filed: Feb. 18, 2020

(65) Prior Publication Data

US 2020/0282496 A1    Sep. 10, 2020

(30) Foreign Application Priority Data

Mar. 4, 2019  (JP) .............................. JP2019-038422
Sep. 5, 2019  (JP) .............................. JP2019-162341

(51) Int. Cl.
*B23K 26/24*       (2014.01)
*B23K 26/38*       (2014.01)
*B23K 26/12*       (2014.01)

(52) U.S. Cl.
CPC .............. *B23K 26/24* (2013.01); *B23K 26/38* (2013.01); *B23K 26/128* (2013.01)

(58) Field of Classification Search
CPC ....... B23K 26/24; B23K 26/128; B23K 26/38

(Continued)

(56) References Cited

U.S. PATENT DOCUMENTS 4,766,048 A * 8/1988 Hisamura .............. G03G 5/047
                                                            430/945
5,502,292 A * 3/1996 Pernicka ................ B23K 26/24
                                                            219/121.63

(Continued)

FOREIGN PATENT DOCUMENTS

JP         2003-263977 A     9/2003
JP      WO2010/131298 A1    11/2010

(Continued)

OTHER PUBLICATIONS

Frank. Enhanced manufacturing possibilities using multi-materials in Laser Metal Deposition, [retrieved on Jan. 11, 2022]. Retrieved from the Internet <URL: https://www.researchgate.net/publication/325976083_Enhanced_manufacturing_possibilities_using_multi-materials_in_Laser_Metal_Deposition> (Year: 2017).*

(Continued)

*Primary Examiner* — Jimmy Chou
(74) *Attorney, Agent, or Firm* — Oblon, McClelland, Maier & Neustadt, L.L.P.

(57) ABSTRACT

A welding method according to an embodiment includes a preparation process and a welding process. A first welding material and a second welding material are prepared in the preparation process. The first welding material and the second welding material are welded in the welding process by irradiating a laser beam on at least one of the first welding material or the second welding material. At least one of the first welding material or the second welding material includes a first portion and a second portion. A laser absorptance of the second portion is higher than a laser absorptance of the first portion. The first welding material and the second welding material are welded in the welding process by irradiating the laser beam on the second portion.

4 Claims, 5 Drawing Sheets

(58) Field of Classification Search
USPC .................................................. 219/121.64
See application file for complete search history.

(56) References Cited

U.S. PATENT DOCUMENTS

| | | | | |
|---|---|---|---|---|
| 5,603,853 | A * | 2/1997 | Mombo-Caristan | ......................... B23K 15/006 219/121.64 |
| 6,844,522 | B1 * | 1/2005 | Wang | ..................... B23K 33/00 219/121.64 |
| 8,546,720 | B2 * | 10/2013 | Lin | ....................... B23K 26/348 219/121.46 |
| 11,390,765 | B2 * | 7/2022 | Furukawa | ............ C09D 11/102 |
| 2003/0226828 | A1 * | 12/2003 | Arya | .................... B23K 11/002 219/121.64 |
| 2004/0173587 | A1 * | 9/2004 | Musselman | ........ B23K 26/0093 219/121.64 |
| 2005/0082265 | A1 * | 4/2005 | Yamabuki | ........... B29C 65/1654 219/121.64 |
| 2005/0218123 | A1 * | 10/2005 | Hayakawa | ............ B29C 66/836 219/121.64 |
| 2009/0050608 | A1 * | 2/2009 | Hayashi | ................. B23K 11/115 219/121.14 |
| 2009/0114625 | A1 * | 5/2009 | Palmquist | ............ B23K 1/0056 219/121.64 |
| 2009/0220815 | A1 * | 9/2009 | Canourgues | ........... B23K 26/32 428/583 |
| 2009/0223940 | A1 * | 9/2009 | Hosoya | .................. B23K 26/22 219/121.64 |
| 2009/0236321 | A1 * | 9/2009 | Hayashi | ................. H01R 4/029 219/121.64 |
| 2009/0283505 | A1 * | 11/2009 | Naumovski | .......... C10M 169/04 219/121.64 |
| 2011/0027645 | A1 * | 2/2011 | Komatsuki | ......... H01M 50/636 429/185 |
| 2012/0055909 | A1 | 3/2012 | Miyake et al. | |
| 2012/0205351 | A1 * | 8/2012 | Yang | .................... B23K 35/004 219/121.64 |
| 2013/0087540 | A1 * | 4/2013 | Gu | ....................... B23K 26/354 219/121.64 |
| 2013/0119025 | A1 * | 5/2013 | Lee | ...................... B23K 26/244 219/121.64 |
| 2013/0302545 | A1 * | 11/2013 | Schnelker | ........... B29C 66/1224 428/34.1 |
| 2014/0003860 | A1 * | 1/2014 | Evangelista | ........... B23K 9/235 403/270 |
| 2014/0061171 | A1 * | 3/2014 | Lin | ................... B23K 26/0626 219/121.64 |
| 2014/0126167 | A1 * | 5/2014 | Bozorgi | ............... B23K 26/206 361/760 |
| 2014/0154521 | A1 * | 6/2014 | Kwon | ...................... B32B 7/04 428/577 |
| 2015/0160377 | A1 | 6/2015 | Kuroda et al. | |
| 2016/0240703 | A1 | 8/2016 | Davidsen et al. | |
| 2016/0332256 | A1 * | 11/2016 | Gu | ....................... B23K 26/144 |
| 2017/0120391 | A1 * | 5/2017 | Schmit | .................. B23K 26/60 |
| 2017/0232553 | A1 * | 8/2017 | Sievi | .................. B23K 26/0869 219/121.64 |
| 2018/0351130 | A1 * | 12/2018 | Boek | ...................... H01L 51/56 |
| 2020/0001402 | A1 * | 1/2020 | Schmit | .................. B23K 26/26 |
| 2020/0009685 | A1 * | 1/2020 | Kumazawa | ........... B23K 26/24 |
| 2020/0180077 | A1 * | 6/2020 | Riquelme | ............ B23K 26/073 |

FOREIGN PATENT DOCUMENTS

| | | | | |
|---|---|---|---|---|
| JP | 2014-029476 | A | 2/2014 | |
| JP | 2016-532317 | A | 10/2016 | |
| JP | 2016-189469 | A | 11/2016 | |
| WO | WO-2016075272 | A1 * | 5/2016 | ........... B23K 20/103 |

OTHER PUBLICATIONS

Okamoto, "Study on stabilization of optical absorptance and penetration depth in fine laser welding of copper", Okayama University Graduate School of Natural Science, 16 pages (with English Machine Translation).

* cited by examiner

ABSTRACT# WELDING METHOD

CROSS-REFERENCE TO RELATED APPLICATIONS

This application is based upon and claims the benefit of priority from Japanese Patent Application No. 2019-038422, filed on Mar. 4, 2019 and No. 2019-162341, filed on Sep. 5, 2019; the entire contents of which are incorporated herein by reference.

FIELD

Embodiments described herein relate generally to a welding method.

BACKGROUND

There is a method of welding multiple welding materials to each other by irradiating a laser beam. For example, when attempting to weld welding materials including copper or the like by irradiating a laser beam of a wavelength in the near-infrared region, the absorptance for the laser beam is low (i.e., the laser reflectance is high); therefore, problems occur such as unstable melting and difficulty performing stable welding.

DETAILED DESCRIPTION

Figure 1A:
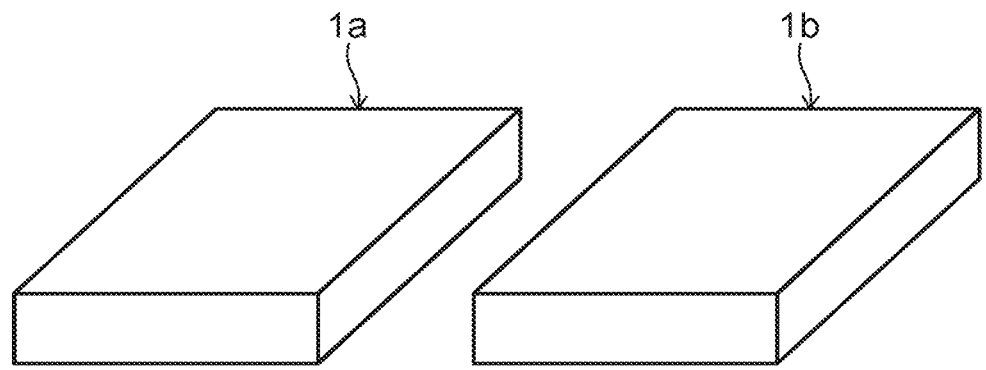
FIG. 1A to FIG. 1C are descriptive views schematically illustrating the flow of a welding method according to an embodiment.

A welding method according to an embodiment includes a preparation process and a welding process. A first welding material and a second welding material are prepared in the preparation process. The first welding material and the second welding material are welded in the welding process by irradiating a laser beam on at least one of the first welding material or the second welding material. At least one of the first welding material or the second welding material includes a first portion and a second portion. A laser absorptance of the second portion is higher than a laser absorptance of the first portion. The first welding material and the second welding material are welded in the welding process by irradiating the laser beam on the second portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 1B:
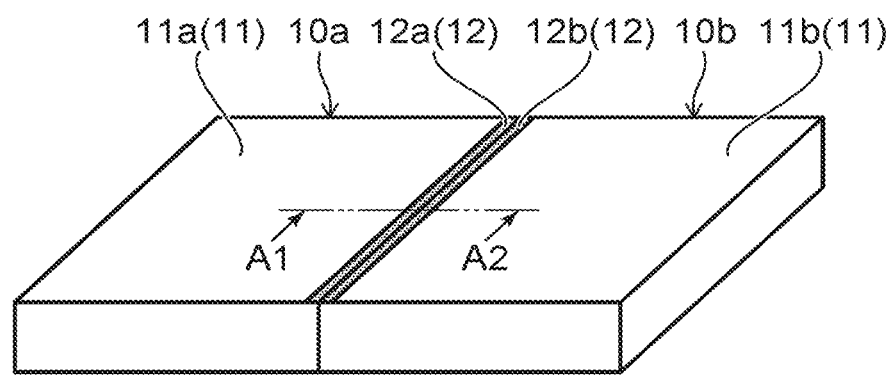
Figure 1C:
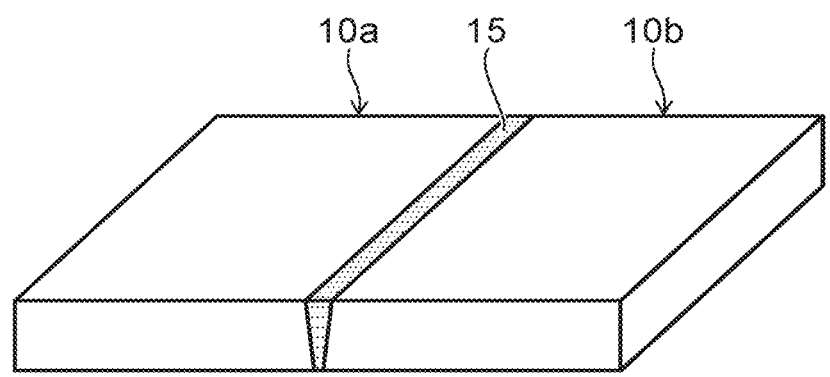

FIG. 1A to FIG. 1C are descriptive views schematically illustrating the flow of a welding method according to an embodiment.

As illustrated in FIG. 1A to FIG. 1C, the welding method according to the embodiment includes a preparation process and a welding process.

In the welding method according to the embodiment, first, as illustrated in FIG. 1A and FIG. 1B, a first welding material 10a and a second welding material 10b which are the welding object are prepared (the preparation process).

At least one of the first welding material 10a or the second welding material 10b includes a first portion 11 and a second portion 12. The laser absorptance of the second portion 12 is higher than the laser absorptance of the first portion 11. In other words, the laser reflectance of the second portion 12 is lower than the laser reflectance of the first portion 11.

In the example, the first welding material 10a includes a first portion 11a and a second portion 12a; and the second welding material 10b includes a first portion lib and a second portion 12b. In other words, the first welding material 10a and the second welding material 10b each include the first portion 11 and the second portion 12. The first portion 11 and the second portion 12 may be formed in only one of the first welding material 10a or the second welding material 10b. In the preparation process, first, a main material 1a and a main material 1b are prepared as illustrated in FIG. 1A. The main material 1a and the main material 1b include, for example, metals. The main material 1a and the main material 1b include, for example, copper or aluminum. The main material 1a and the main material 1b may be of the same material or may be of different materials.

Then, in the preparation process as illustrated in FIG. 1B, surface processing that improves the laser absorptance is performed on a portion of the main material 1a and a portion of the main material 1b. Thereby, the first welding material 10a and the second welding material 10b are made to include portions having relatively low laser absorptances (i.e., the first portions 11) and portions having relatively high laser absorptances (i.e., the second portions 12).

That is, in the main material 1a and the main material 1b, the portions where the laser absorptances are improved by performing the surface processing become the second portions 12; and the portions where the surface processing is not performed and the laser absorptances are not improved become the first portions 11. Thus, by performing the surface processing on the main material 1a and the main material 1b, the first welding material 10a or the second welding material 10b including the first portions 11 having the relatively low laser absorptances and the second portions 12 having the relatively high laser absorptances can be made from the main material 1a and the main material 1b which have uniform laser absorptances. The surface processing is described below.

Then, in the welding method according to the embodiment as illustrated in FIG. 1B and FIG. 1C, the first welding material 10a and the second welding material 10b are welded by irradiating a laser beam on at least one of the first welding material 10a or the second welding material 10b (the welding process). In the welding process of the example, the laser beam is irradiated on both the first welding material 10a and the second welding material 10b.

In the welding process, the first welding material 10a and the second welding material 10b are welded by irradiating the laser beam on the second portions 12. In the welding process of the example, the first welding material 10a and the second welding material 10b are welded by irradiating the laser beam on both the second portion 12a of the first welding material 10a and the second portion 12b of the second welding material 10b.

When the laser beam is irradiated on the second portions 12, the second portions 12 and the periphery of the second portions 12 are heated and melted. Subsequently, a bead 15 is formed when the melted portion cools and solidifies. The first welding material 10a and the second welding material 10b are joined by the bead 15. The welding process is described below.

As described above, the laser absorptance of the second portion 12 is higher than the laser absorptance of the first portion 11. Therefore, in the welding process, the irradiated laser beam can be absorbed sufficiently because the laser beam is irradiated on the second portion 12 having the relatively high laser absorptance. In other words, because the laser absorptance of the portion where the laser beam will be irradiated in the welding process is caused to be relatively high beforehand, the irradiated laser beam can be absorbed sufficiently when the laser beam is irradiated in the welding process. Thereby, even when welding a welding material having a low absorptance for the laser beam, the laser beam can be absorbed sufficiently in the welding process; the melting can be stabilized; and stable welding can be performed.

According to the embodiment, the laser irradiation time of the welding process can be shortened because the laser beam can be absorbed sufficiently because the laser beam is irradiated on the second portion 12 having the relatively high laser absorptance in the welding process. Thereby, the yield can be increased; and the occurrence of sputtering can be suppressed.

Normally, in the case where a welding material including copper or the like is welded, the absorptance for the laser beam is low (i.e., the laser reflectance is high); therefore, it is necessary to irradiate a high-output laser beam. Accordingly, it is difficult to adjust the width and/or the depth of the bead 15 when welding a welding material including copper, etc. Conversely, according to the embodiment, because the laser beam is irradiated on the second portion 12 having a relatively high laser absorptance in the welding process, the welding material can be welded even when a low-output laser beam is irradiated. Accordingly, the width and/or the depth of the bead 15 can be adjusted; and finer welding is possible.

In the embodiment, the width of the bead 15 can be adjusted by adjusting the width of the second portion 12. In other words, the width of the bead 15 can be set to be wide by setting the width of the second portion 12 to be wide; and the width of the bead 15 can be set to be narrow by setting the width of the second portion 12 to be narrow.

In the embodiment, the depth of the bead 15 can be adjusted by adjusting the output of the irradiated laser beam. In other words, the depth of the bead 15 can be set to be shallow by setting the output of the irradiated laser beam to be small; and the depth of the bead 15 can be set to be deep by setting the output of the irradiated laser beam to be large.

Although the case where the first welding material 10a and the second welding material 10b are welded using a butt joint is illustrated in FIG. 1A to FIG. 1C, the joint of the welding method according to the embodiment is not limited thereto. The joint of the welding method according to the embodiment may be, for example, a T-joint, a corner joint, a lap joint, etc.

For example, when the first welding material 10a and the second welding material 10b are overlaid and welded using a lap joint by irradiating the laser beam from the first welding material 10a side, the laser beam is irradiated only on the first welding material 10a in the welding process. Accordingly, in such a case, the second portion 12 may be formed only in the first welding material 10a; and the second portion 12 may not be formed in the second welding material 10b. In other words, in such a case, the surface processing is performed only on the main material 1a used to form the first welding material 10a; and the surface processing may not be performed on the main material 1b used to form the second welding material 10b. In the embodiment, the first welding material 10a and the second welding material 10b in which the first portion 11 and the second portion 12 are preformed may be used. The surface processing of the main material 1a and the main material 1b is omissible when such a first welding material 10a and such a second welding material 10b are used.

Figure 2:
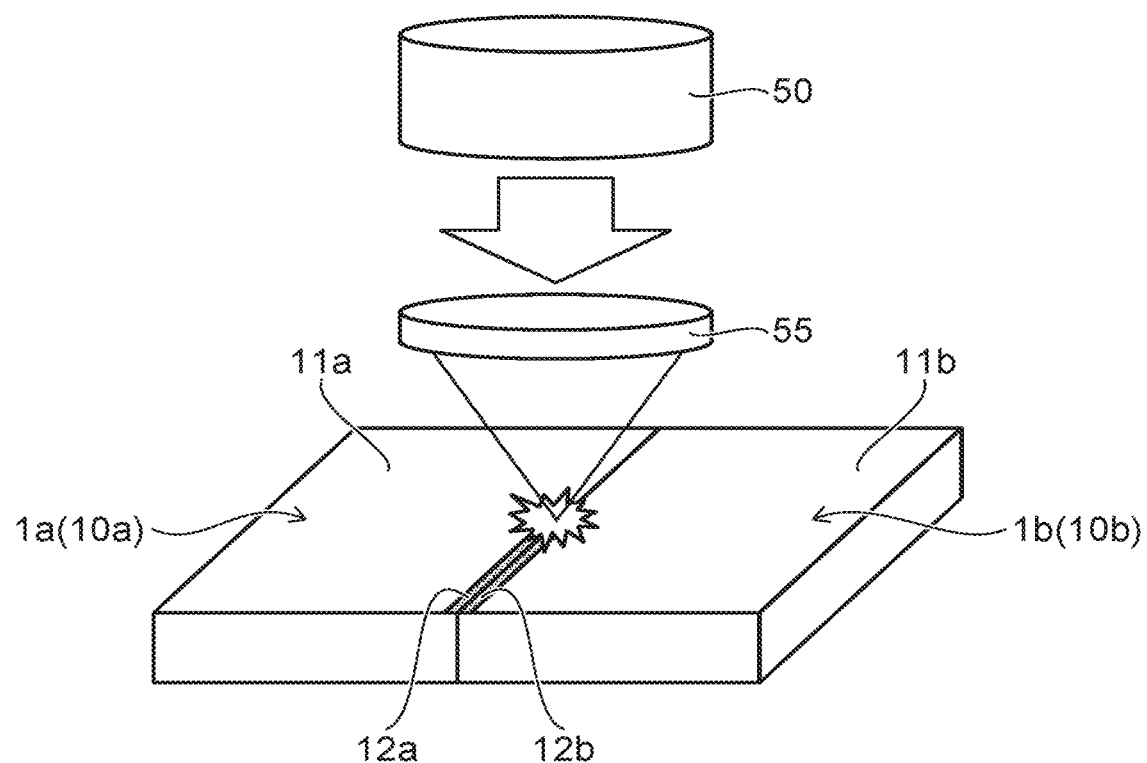
FIG. 2 is a descriptive view schematically illustrating the surface processing in the preparation process of the welding method according to the embodiment.

FIG. 2 is a descriptive view schematically illustrating the surface processing in the preparation process of the welding method according to the embodiment.

As illustrated in FIG. 2, for example, the surface processing is performed by laser ablation. Laser ablation is technology in which the surface of a member is processed by irradiating a laser beam. In the laser ablation, a laser beam that is irradiated from a laser device 50 is concentrated by a lens 55 and irradiated on a portion of the main material 1a and a portion of the main material 1b.

The portion of the main material 1a where the laser beam is irradiated is modified by the laser beam to become the second portion 12a; and the portion where the laser beam is not irradiated is not modified and remains as-is (i.e., as the first portion 11a). Similarly, the portion of the main material 1b where the laser beam is irradiated is modified by the laser beam to become the second portion 12b; and the portion where the laser beam is not irradiated is not modified and remains as-is (i.e., as the first portion 11b).

For example, it may be considered to perform the surface processing by using a chemical; but in such a method, if the cleaning after the surface processing is insufficient, there is a risk that the quality of the weld may degrade due to the chemical (an impurity) mixing into the bead 15 in the welding process. Also, a method may be considered in which the laser absorptance is improved without performing surface processing by adhering a sheet or the like to the first welding material 10a and/or the second welding material 10b; but in such a method, there is a risk that the quality of the weld may degrade due to components included in the sheet (impurities) mixing into the bead 15 in the welding process.

Conversely, by performing the surface processing by laser ablation, the mixing of an impurity into the bead 15 can be suppressed; and the degradation of the quality of the weld can be suppressed. Also, the labor and/or the cost can be reduced compared to when the surface processing is performed using a chemical or when a sheet or the like improving the laser absorptance is adhered to the first welding material 10a and/or the second welding material 10b.

For example, the laser device 50 that is used in the laser ablation is a pulsed laser in which the output has a pulse form oscillating at a constant repetition frequency (pulse width). The laser device 50 is, for example, a femtosecond laser or a picosecond laser. In other words, the pulse width of the laser beam irradiated in the laser ablation is, for example, several femtoseconds or several picoseconds. The wavelength of the laser beam irradiated in the laser ablation is, for example, not less than 300 nm and not more than 1070 nm.

Thus, by using a femtosecond laser or a picosecond laser, the effects due to the heat in the laser irradiation such as deformation of the main material 1a or the main material 1b, a material property change of the main material 1a or the main material 1b, etc., can be suppressed. Also, finer processing is possible by using a femtosecond laser or a picosecond laser. Namely, the second portion 12 can be formed to have the desired size at the desired position of the main material 1a and/or the main material 1b.

Figure 3:
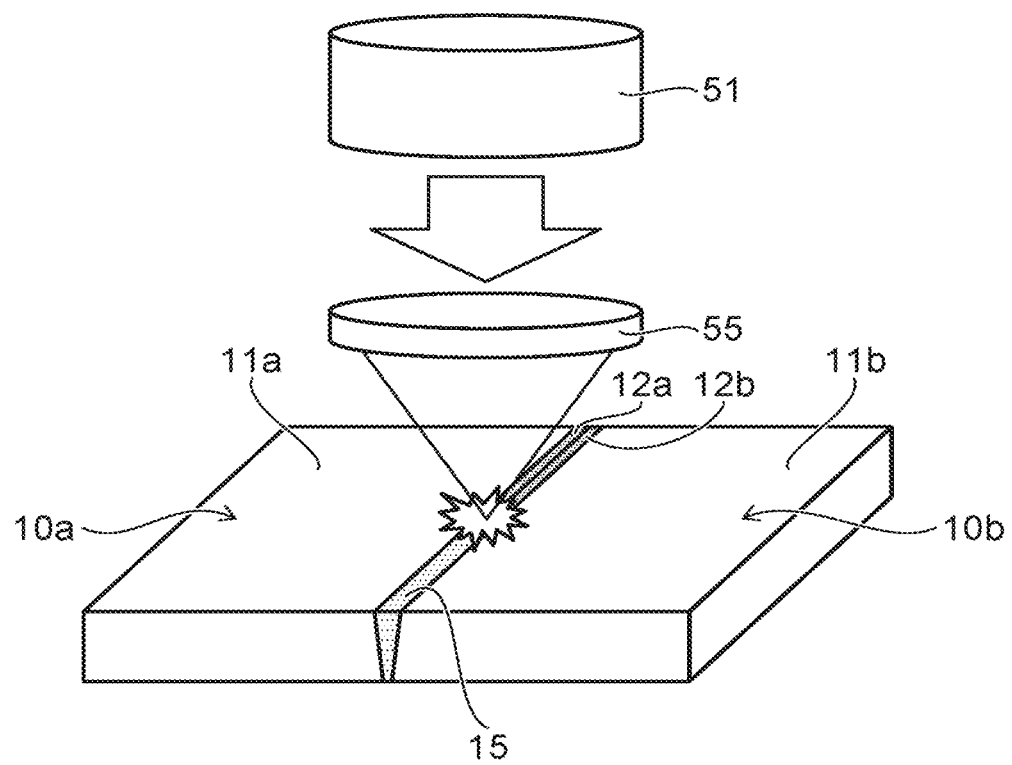
FIG. 3 is a descriptive view schematically illustrating the welding process of the welding method according to the embodiment.

FIG. 3 is a descriptive view schematically illustrating the welding process of the welding method according to the embodiment.

In the welding process as illustrated in FIG. 3, for example, a laser beam that is irradiated from a laser device 51 is concentrated by the lens 55 and irradiated on the second portion 12a of the first welding material 10a and the second portion 12b of the second welding material 10b.

In the first welding material 10a, the second portion 12a where the laser beam is irradiated is melted by the laser beam to become the bead 15; and the first portion 11a where the laser beam is not irradiated remains without melting. Similarly in the second welding material 10b, the second portion 12b where the laser beam is irradiated is melted by the laser beam to become the bead 15; and the first portion 11b where the laser beam is not irradiated remains without melting.

The laser device 51 that is used in the welding process is, for example, a CW (Continuous Wave) laser oscillating continuously at a constant output. The laser device 51 may be a pulsed laser. The wavelength of the laser beam irradiated in the welding process is, for example, not less than 1020 nm and not more than 1070 nm, and favorably 1060 nm.

In the embodiment, it is favorable for the second portion 12 not to remain after the welding process. In other words, it is favorable for the second portion 12 to be provided in the minimum area covering the portion where the laser beam is irradiated in the welding process.

Figure 4:
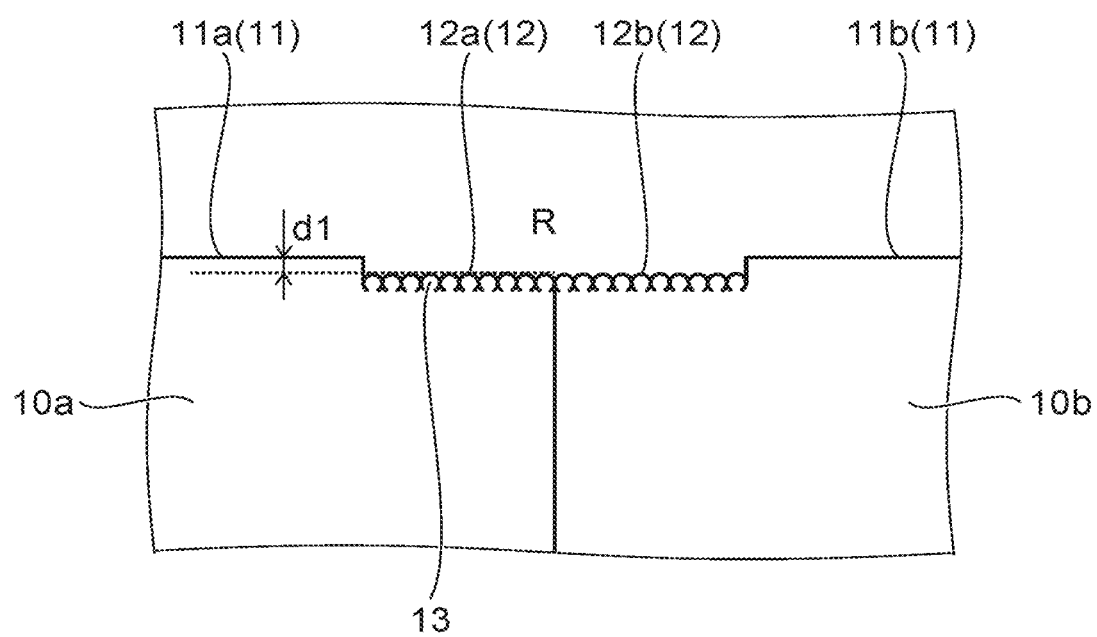
FIG. 4 is a cross-sectional view schematically illustrating the periphery of the second portions of the welding materials in the welding method according to the embodiment.

FIG. 4 is a cross-sectional view schematically illustrating the periphery of the second portions of the welding materials in the welding method according to the embodiment.

Figure 5:
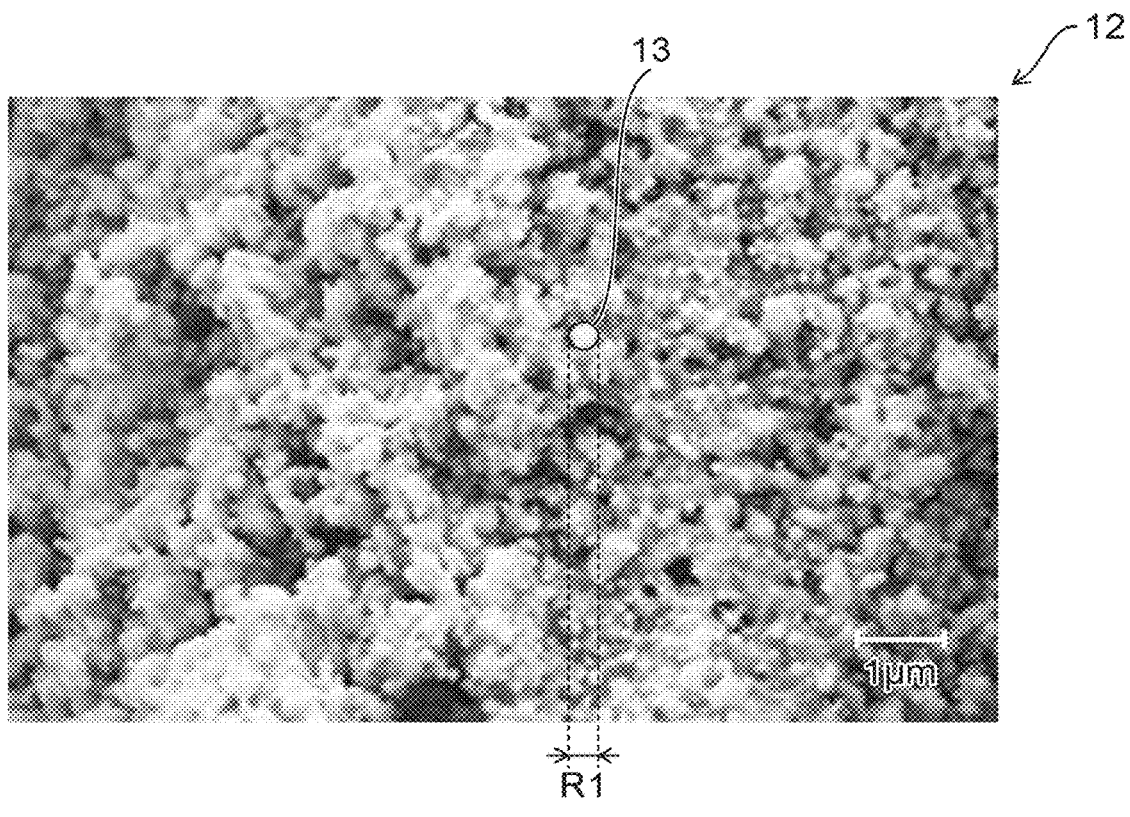
FIG. 5 is an example of an electron micrograph illustrating an enlargement of a portion of the second portion of the welding material of the welding method according to the embodiment.

FIG. 5 is an example of an electron micrograph illustrating an enlargement of a portion of the second portion of the welding material of the welding method according to the embodiment.

FIG. 4 is a cross-sectional view along line A1-A2 shown in FIG. 1B.

As illustrated in FIG. 4 and FIG. 5, the second portion 12 includes an unevenness. For example, the surface roughness of the second portion 12 is larger than the surface roughness of the first portion 11.

More specifically, for example, the second portion 12 includes a protrusion 13 having a granular configuration. Here, the granular protrusion 13 is a portion protruding in a spherical configuration toward the side from which the laser beam is irradiated.

Thus, because the second portion 12 includes the granular protrusions 13, the absorptance for the laser beam can be improved more effectively. It is considered that this is because when the laser beam is irradiated in the welding process, the laser beam is scattered by the granular protrusions 13; and the scattered laser beam enters the gaps between the granular protrusions 13 and is absorbed easily by the second portion 12 without being reflected.

The average of diameters R1 of the circumcircles of the granular protrusions 13 is, for example, not less than 10 nm and not more than 100 nm. By setting the granular protrusion 13 to such a size, the absorptance for the laser beam can be improved more effectively. For example, the average of the diameters R1 of the circumcircles of the granular protrusions 13 can be determined using the average of the diameters R1 of the circumcircles of the granular protrusions 13 existing within a prescribed area in an electron micrograph such as that shown in FIG. 5.

The density of the granular protrusions 13 existing in the second portion 12 is, for example, not less than 10000/mm$^2$ and not more than 1 million/mm$^2$. The absorptance for the laser beam can be improved more effectively by such a density of the granular protrusions 13 existing in the second portion 12.

A processing depth d1 due to the surface processing is, for example, 0.1 mm or less, and favorably 0.01 mm or less. The processing depth d1 is the distance between the first portion 11 and the second portion 12 in the direction in which the laser beam is irradiated.

Thus, by setting the processing depth d1 to be 0.1 mm or less, a dimensional change due to the surface processing can be suppressed. Also, the time necessary for the surface processing is short for such a processing depth d1; therefore, the effects of the heat of the surface processing such as the deformation of the main material 1a or the main material 1b, the material property change of the main material 1a or 1b, etc., can be suppressed.

For example, it is considered that the size of the granular protrusion 13, the density of the granular protrusions 13, and the processing depth d1 due to the surface processing can be adjusted by the processing conditions when performing the surface processing. More specifically, for example, when the surface processing is performed by laser ablation, it is considered that the size of the granular protrusion 13, the density of the granular protrusions 13, and the processing depth d1 due to the surface processing can be adjusted by adjusting at least one of the output of the pulsed laser, the pulse width, or the irradiation time of the laser beam.

It is favorable for the pulse width of the laser beam irradiated in the laser ablation to be 100 picoseconds or less. If the pulse width is 100 picoseconds or less, the granular protrusion 13 is formed easily compared to when the pulse width exceeds 100 picoseconds. Accordingly, it is easy to improve the absorptance for the laser beam at the second portion 12 after the surface processing.

In the embodiment, the size of the granular protrusion 13, etc., also can be adjusted by the atmosphere when performing the laser ablation. For example, the laser ablation is performed in an oxygen-including atmosphere or an inert gas atmosphere in which the oxygen is purged using an inert gas. The inert gas is, for example, nitrogen, helium, or argon. The gas viscosities of helium and argon are lower than the gas viscosity of nitrogen. Therefore, the occurrence of voids in the second portion 12 can be suppressed by using helium or argon compared to when nitrogen is used.

Different states of the second portion 12 after the surface processing due to different atmospheres when performing the laser ablation will now be described.

Figure 6:
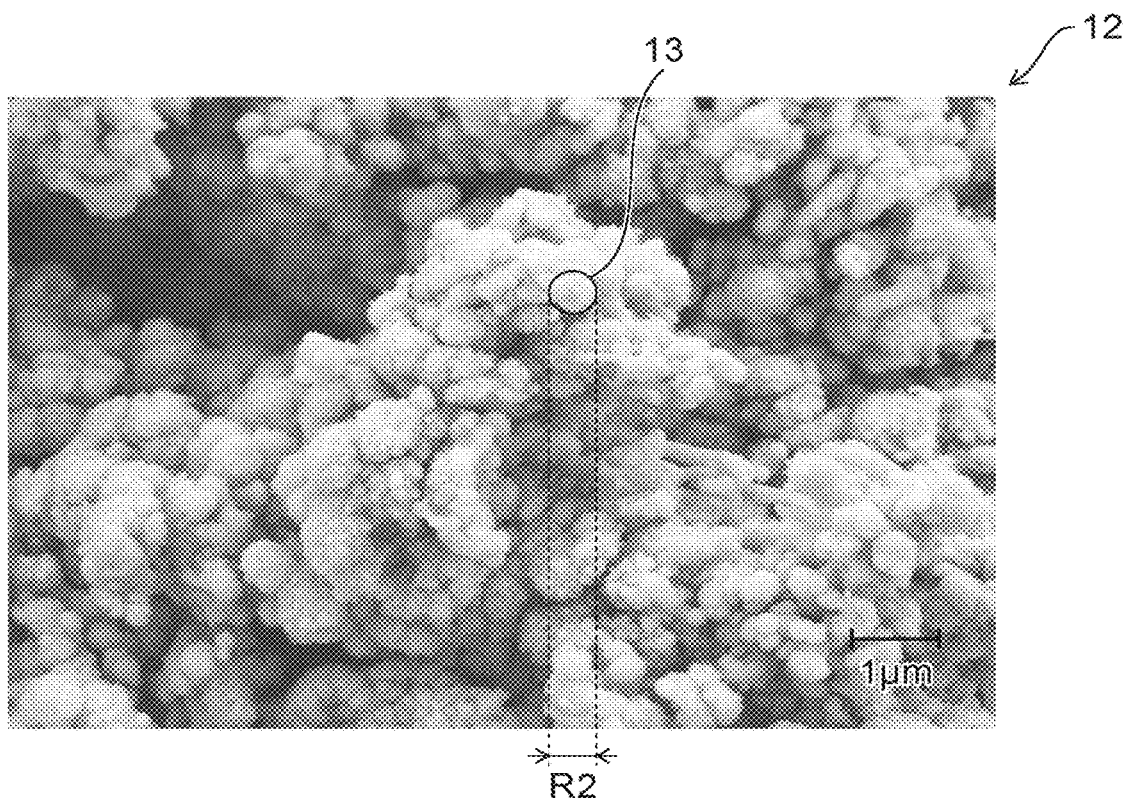
FIG. 6 is an example of an electron micrograph illustrating an enlargement of a portion of the second portion of the welding material of a welding method according to a modification of the embodiment.

FIG. 6 is an example of an electron micrograph illustrating an enlargement of a portion of the second portion of the welding material of a welding method according to a modification of the embodiment.

Figure 7:
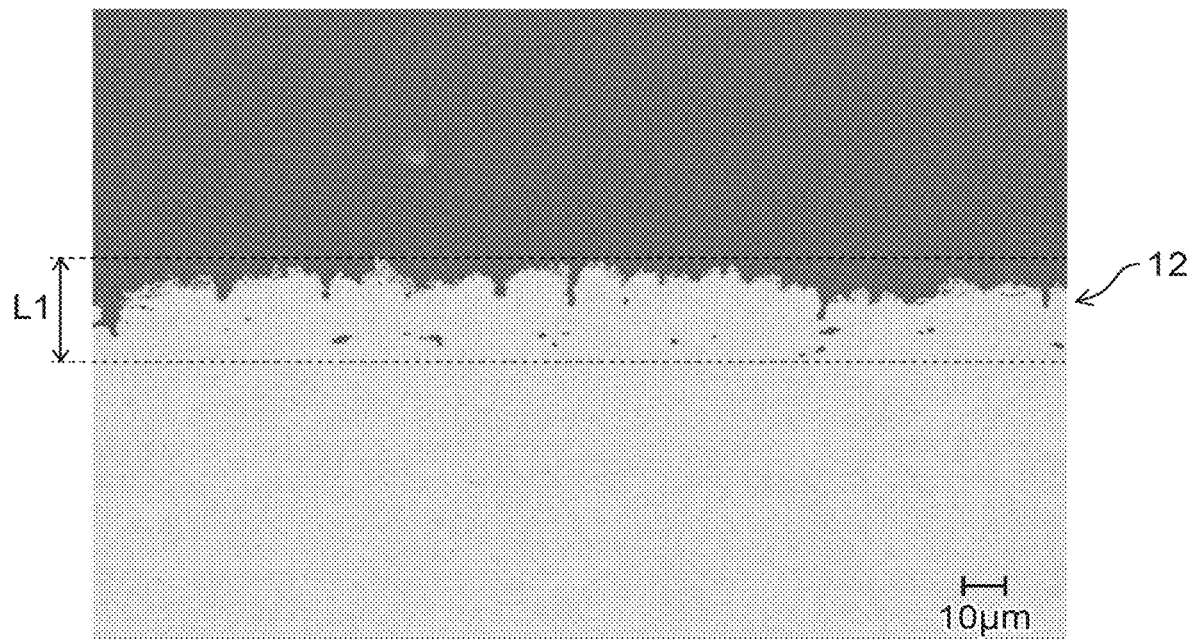
FIG. 7 is an example of an electron micrograph illustrating an enlargement of a cross section of the second portion of the welding material of the welding method according to the embodiment.

FIG. 7 is an example of an electron micrograph illustrating an enlargement of a cross section of the second portion of the welding material of the welding method according to the embodiment.

Figure 8:
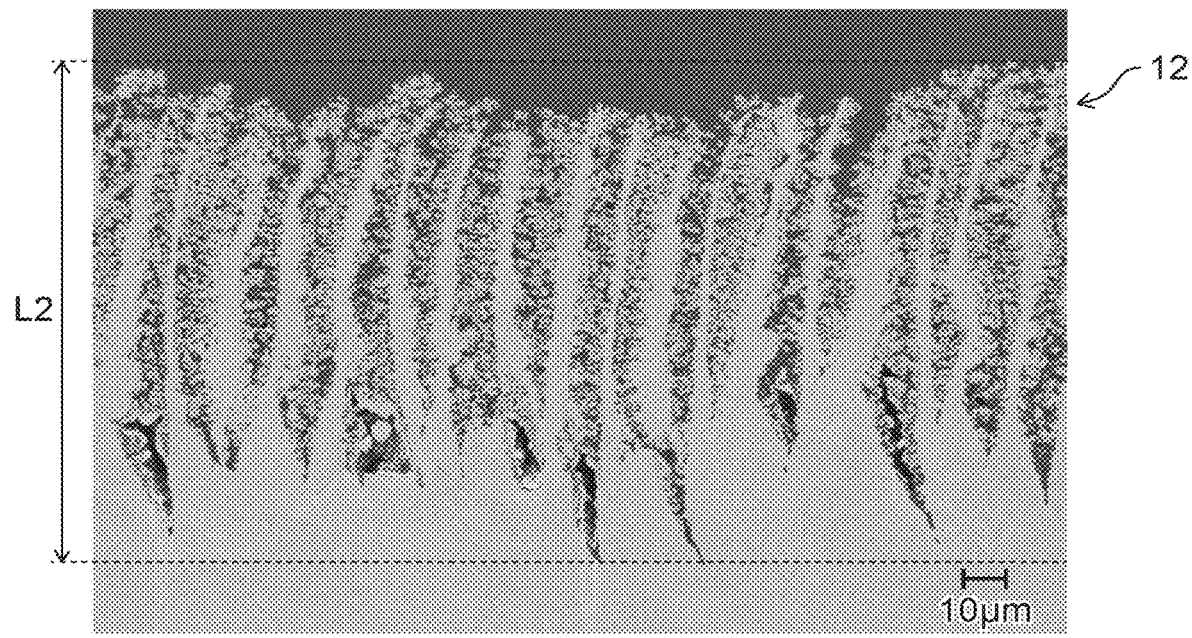
FIG. 8 is an example of an electron micrograph illustrating an enlargement of a cross section of the second portion of the welding material of a welding method according to a modification of the embodiment.

FIG. 8 is an example of an electron micrograph illustrating an enlargement of a cross section of the second portion of the welding material of a welding method according to a modification of the embodiment.

FIG. 5 illustrates a portion of the second portion 12 when the laser ablation is performed in an oxygen-including atmosphere. FIG. 7 illustrates the cross section of the second portion 12 when the laser ablation is performed in the oxygen-including atmosphere. On the other hand, FIG. 6 illustrates a portion of the second portion 12 when the laser ablation is performed in an inert gas atmosphere. FIG. 8 illustrates a cross section of the second portion 12 when the laser ablation is performed in the inert gas atmosphere.

As illustrated in FIG. 5 and FIG. 6, the average of diameters R2 of the circumcircles of the granular protrusions 13 of the second portion 12 when the laser ablation is performed in the inert gas atmosphere is larger than the average of the diameters R1 of the circumcircles of the granular protrusions 13 of the second portion 12 when the laser ablation is performed in the oxygen-including atmosphere. That is, the size of the granular protrusion 13 of the second portion 12 when the laser ablation is performed in the inert gas atmosphere is larger than the size of the granular protrusion 13 of the second portion 12 when the laser ablation is performed in the oxygen-including atmosphere. Although the size (the diameter R2) of the granular protrusion 13 is distributed in a range of several tens of nm to several μm when the laser ablation is performed in the inert gas atmosphere, basically, the scattering efficiency is high for diameters of 380 nm or more due to Mie scattering theory; and the same effects are obtained using sizes having diameters of 380 nm or more.

Thus, the granular protrusion 13 of the second portion 12 can be larger by performing the laser ablation in an inert gas atmosphere than by performing the laser ablation in an oxygen-including atmosphere. The absorptance for the laser beam of the second portion 12 can be improved thereby.

On the other hand, when the laser ablation is performed in the oxygen-including atmosphere, the second portion 12 is oxidized by the oxygen in the atmosphere. If the main material 1a and the main material 1b includes copper or aluminum, the copper or the aluminum of the second portion 12 is oxidized to become black copper oxide or aluminum oxide. The absorptance for the laser beam of the second portion 12 can be improved thereby.

As illustrated in FIG. 7 and FIG. 8, a depth L2 of the modified region of the second portion 12 when the laser ablation is performed in the inert gas atmosphere is greater than a depth L1 of the modified region of the second portion 12 when the laser ablation is performed in the oxygen-including atmosphere.

Thus, by performing the laser ablation in an inert gas atmosphere, the second portion 12 can be modified to a deeper position than when the laser ablation is performed in an oxygen-including atmosphere. The absorptance for the laser beam of the second portion 12 can be improved thereby. The absorptance for the laser beam of the second portion 12 can be improved as the depth of the modified region of the second portion 12 is increased.

As illustrated in FIG. 8, the second portion 12 is modified into a comb-shaped configuration when the laser ablation is performed in the inert gas atmosphere. Because the laser beam enters the gaps in the second portion 12 modified into the comb-shaped configuration, the absorptance for the laser beam of the second portion 12 can be improved further.

According to the embodiments as described above, a welding method can be provided in which stable welding is possible even when a welding material having a low absorptance for the laser beam is welded.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A welding method, comprising:
  a preparation process of preparing a first welding material and a second welding material; and
  a welding process of welding the first welding material and the second welding material by irradiating a laser beam on at least one of the first welding material or the second welding material,
  the at least one of the first welding material or the second welding material including a first portion and a second portion, a laser absorptance of the second portion being higher than a laser absorptance of the first portion,
  the first welding material and the second welding material being welded in the welding process by irradiating the laser beam on the second portion,
  wherein the at least one of the first welding material or the second welding material including the first portion and the second portion is made in the preparation process by performing surface processing on a portion of a main material to improve a laser absorptance,
  wherein the second portion includes protrusions having a granular configuration,
  wherein a density of the granular protrusions existing in the second portion is not less than $10{,}000/\text{mm}^2$ and not more than 1 million/$\text{mm}^2$, and
  an average of diameters of circumcircles of the granular protrusions is not less than 10 nm and not more than 100 nm.

2. The method according to claim 1, wherein the surface processing is performed by laser ablation.

3. The method according to claim 2, wherein a pulse width of a laser beam irradiated in the laser ablation is 100 picoseconds or less.

4. The method according to claim 1, wherein a processing depth of the surface processing is 0.1 mm or less.

\* \* \* \* \*